United States Patent [19]

Leopold et al.

[11] 3,973,660
[45] Aug. 10, 1976

[54] TRANSMISSION DEVICE AND CAM ACTUATOR THEREFORE

[75] Inventors: Donald L. Leopold; Clifford C. Moulton, Sr., both of Minneapolis, Minn.

[73] Assignee: Capsule Clutch Inc., Minneapolis, Minn.

[22] Filed: Dec. 11, 1974

[21] Appl. No.: 531,791

[52] U.S. Cl. ............................ 192/93 A; 192/89 A
[51] Int. Cl.² ........................................ F16D 23/00
[58] Field of Search ....................... 192/89 A, 93 A

[56] References Cited
UNITED STATES PATENTS

| | | | |
|---|---|---|---|
| 1,011,834 | 12/1911 | Nichoalds | 192/89 A X |
| 1,405,927 | 2/1922 | Lauth | 192/89 A X |
| 1,438,486 | 12/1922 | Gorman | 192/93 A |
| 2,485,741 | 10/1949 | King | 192/93 A X |
| 2,661,826 | 12/1953 | Hendrickson et al. | 192/93 A |
| 2,848,086 | 8/1958 | Warsaw | 192/93 A |
| 2,853,166 | 9/1958 | Campbell | 192/93 A X |
| 3,841,453 | 10/1974 | Culbertson | 192/93 A X |

*Primary Examiner*—Samuel Scott
*Assistant Examiner*—Lance W. Chandler
*Attorney, Agent, or Firm*—Williamson, Bains & Moore

[57] ABSTRACT

A transmission device includes a housing having a clutch assembly therein interposed in controlling relation between an input shaft and an output shaft. The clutch assembly, preferably a wet pack, includes a plurality of driver clutch elements splined to the input shaft, and a plurality of driven clutch elements connected with the output shaft. A non-rotatable axially shiftable force applying plate is operable for shifting a pressure plate axially along the input shaft to shift the clutch assembly into and out of driving relation with respect to the output shaft. A clutch actuator assembly includes a revolvable cam connected with the force applying plate for shifting the same axially of the output shaft. Springs normally urge the clutch actuator assembly and the force applying plate in a declutching direction, the spring pressure being absorbed substantially entirely by the input shaft.

8 Claims, 6 Drawing Figures

3,973,660

TRANSMISSION DEVICE AND CAM ACTUATOR THEREFORE

SUMMARY OF THE INVENTION

This invention relates to a transmission device, and more specifically to a transmission device having a wet pack clutch assembly and a clutch actuator assembly.

It is an object of this invention to provide a transmission device with a novel clutch actuator assembly which is operable to normally urge the clutch assembly by spring pressure into driving relation with respect to the output shaft, the spring pressure being absorbed substantially by the shaft, rather than the housing.

It is also an object of this invention to provide a transmission device including a housing having therein a clutch assembly, preferably a wet clutch pack, and having a clutch actuator assembly including a non-rotatable force applying member for shifting driver clutch elements into and out of driving relation with respect to the driven clutch elements.

These and other objects and advantages of this invention will more fully appear from the following description made in connection with the accompanying drawings, wherein like reference characters refer to the same or similar parts throughout the several views.

FIGURES OF THE DRAWINGS

DESCRIPTION OF THE PREFERRED EMBODIMENTS OF THE INVENTION

Figure 1:
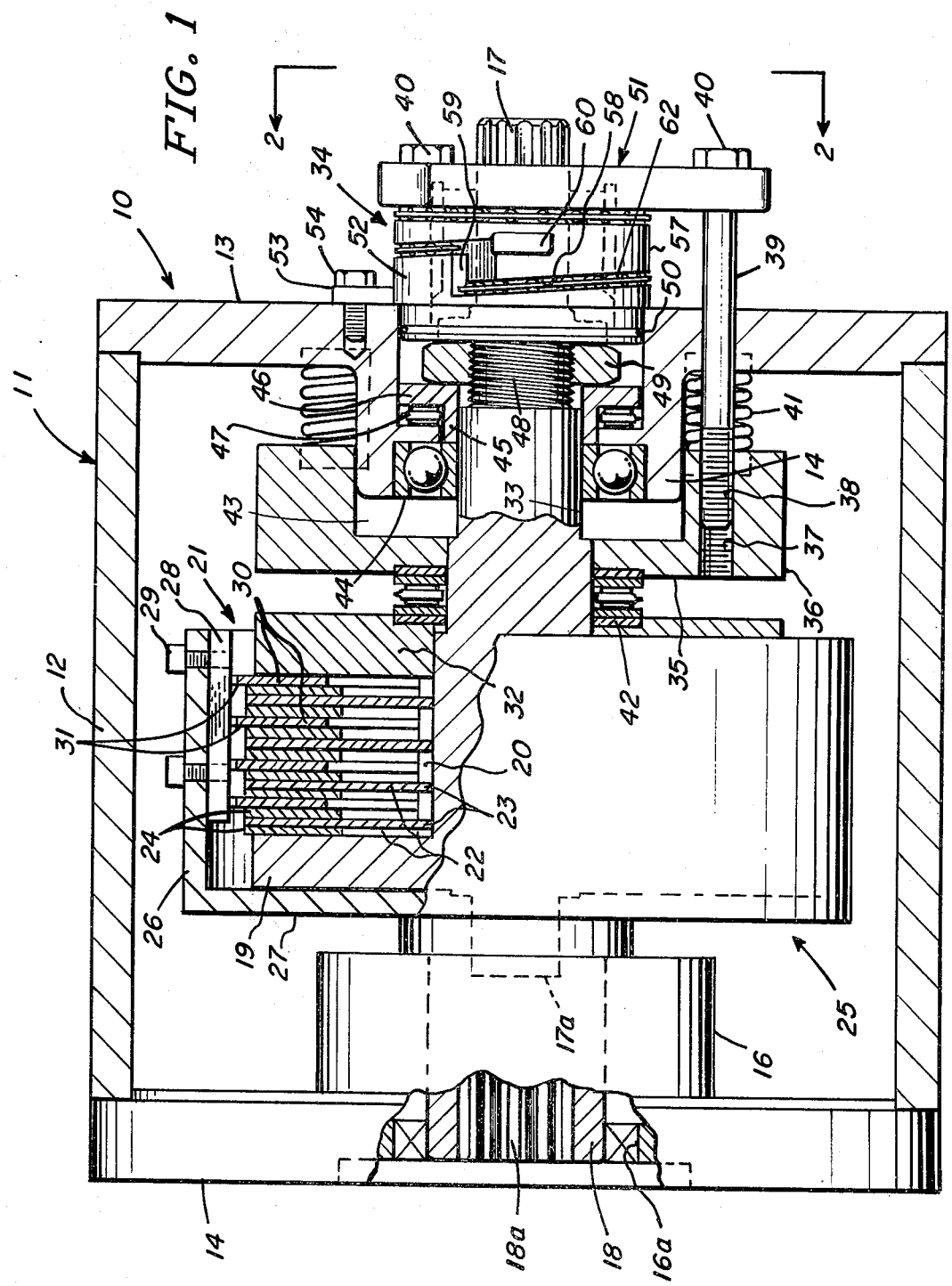
FIG. 1 is a longitudinal sectional view of the transmission device illustrating details of construction thereof and with certain parts thereof being broken away for clarity.
Figure 2:
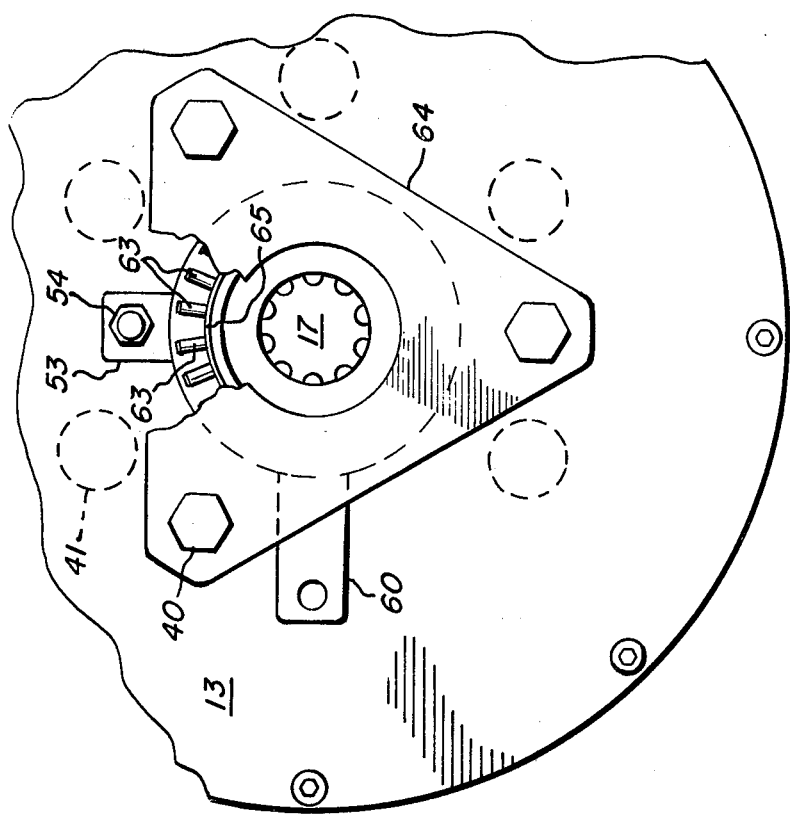
FIG. 2 is a fragmentary end elevational view taken approximately along line 2—2 of FIG. 2 and looking in the direction of the arrows.
Figure 3:
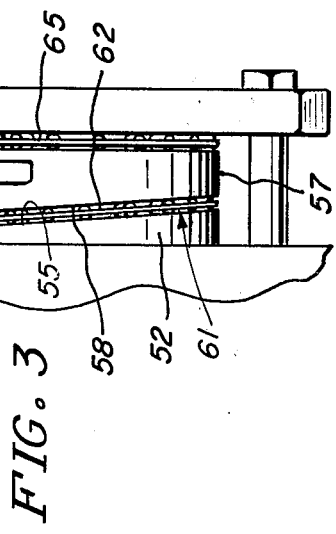
FIG. 3 is a fragmentary end elevational view of the transmission device illustrating clutch actuator assembly and the clutched or drive transmitting condition.
Figure 4:
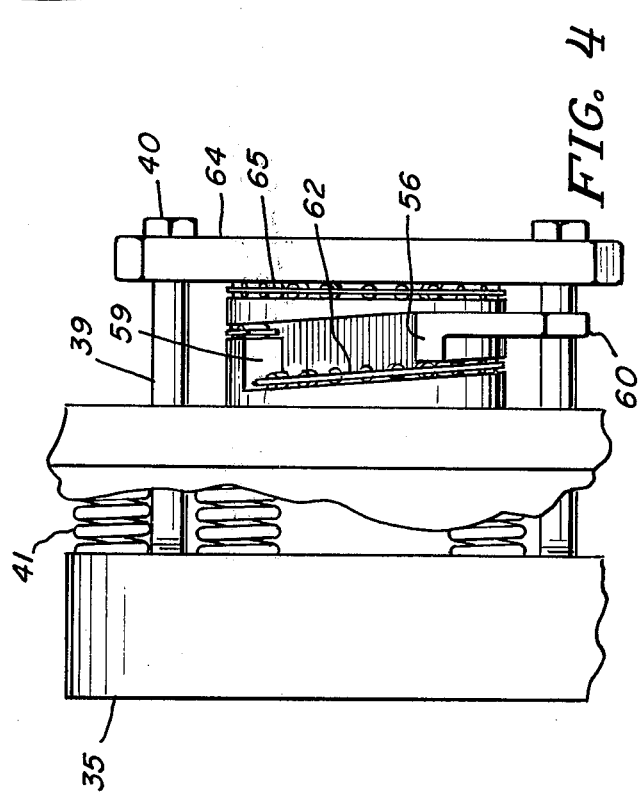
FIG. 4 is a fragmentary end elevational view of the transmission device similar to FIG. 3, but illustrating the clutch actuator assembly in the de-clutched or drive interrupted condition.

Referring now to the drawings and more specifically to FIG. 1, it will be seen that one embodiment of the novel transmission device, designated generally by the reference numeral 10 is there shown. The transmission device 10 includes a generally cylindrical housing 11 comprised of a cylindrical casting 12 having an end wall 13 at one end thereof and an end wall 14 at the other end thereof. The end wall 13 is provided with an inwardly projecting cylindrical boss or sleeve 15 while the end wall 14 is provided with an inwardly projecting cylindrical boss or sleeve 16. An input shaft 17 having one end thereof positioned exteriorly of the housing projects into the housing through the boss 15, the outer or external end of the input shaft being adapted to be connected to a source of power such as internal combustion engines or the like. A generally sleeve type output shaft 18 projects through the end wall 14 and is journaled in the cylindrical boss 16 by suitable bearings (not shown). It will be noted that the sleeve type output shaft 18 is provided with internal splines 18a, which permit the output shaft to be connected to various type driven units to be driven thereby.

The inner end portion of the input shaft 17 is provided with a radial end flange 19 which projects radially outwardly therefrom. The intermediate portion of the input shaft is provided with external splines 20 while the inner end of the input shaft terminates in a reduced end portion 17a.

A clutch assembly 21 is interposed in controlling relation between the input shaft 17 and the output shaft 18. The clutch assembly 21 includes a plurality of similar annular driver clutch elements 22, each having internal splines 23 which interdigitate with the external splines on the input shaft 17. The annular driver clutch elements 22 are concentrically mounted on the input shaft 17 for rotation therewith and for axial movement relative thereto. It will be noted that each of the driver clutch elements 22 has annular clutch facing elements 24 affixed to opposite faces thereof.

The clutch assembly also includes a generally cylindrical driven member 25, comprised of cylindrical wall 26 and end wall 27. The cylindrical driven member 25 is fixedly connected with the output shaft 18 and is revolvable therewith and actually forms a part thereof. The end wall 27 has an opening therethrough and the reduced end portion 17a of the input shaft 17 projects through the openings and into the end of the output shaft 18.

The inner cylindrical wall surface 26 of the cylindrical driven member is provided with a plurality of elongate internal spline bars or elements 28 which are secured in longitudinally extending relation thereto by bolts 29. In the embodiments shown, four such spline bars are provided and are preferably spaced approximately 90° apart. A plurality of similar annular driven clutch elements 30 are positioned concentrically around the input shaft 17 and each of these driven clutch elements 30 has a plurality of external splines 31 formed in the outer surface thereof. The recesses defined by the external splines 31 interdigitate with the internal spline bars 28 of the cylindrical driven member 25 so that the driven clutch elements rotate with the cylindrical driven member 25.

The driven clutch elements are alternately arranged with respect to the driver clutch elements. A heavy annular pressure plate 32 is mounted in concentric relation with the input shaft 17 and is provided with internal splines 33 which interdigitate with the external splines of the input shaft. Thus the pressure plate 32 is revolvable with the input shaft and is axially shiftable relative thereto. It will be noted that the pressure plate 32 as well as the driver and driven clutch elements are all positioned interiorly of the driven member 25.

A clutch actuator assembly is also provided for urging the pressure plate 32 axially of the input shaft to shift the driver clutch elements into and out of driving relation with respect to the driven clutch elements and the output shaft 18. This clutch actuator assembly, designated generally by the reference numeral 34, includes a non-rotatable generally circular annular force transmitting plate 35 having an opening therethrough and being disposed substantially concentrically of the input shaft 17. The force transmitting plate 35 is provided with an annular flange 36 which projects axially therefrom. In this respect, it will be noted that the flange 36 projects axially towards the end wall 13 and is provided with a plurality of threaded bores 37 therein for accommodating the threaded shank portion 38 of the plurality of elongate bolts 39, each having an enlarged head 40.

In the embodiments shown, it will be seen that three such bolts are provided and each projects exteriorly of the end wall 13 through an opening therein. It will also be noted that each bolt 39 has a helical spring 41 positioned therearound, each spring bearing against the force supplying plate 35 and also bearing against the end wall 13. In this respect, the end wall 13 is provided with recesses, each accommodating one end of one of the helical springs 41. It will therefore be seen that the springs 41 serve to urge the force supplying plate 35 axially of the input shaft and towards the pressure plate 32 to thereby urge the clutch assembly into driving relation with respect to the output shaft 18. A thrust needle bearing 42 is interposed between and engages confronting faces of the pressure plate 32 and the force applying member 35. It will therefore be seen that while the pressure plate 32 is revolvable with the input shaft, the force applying plate while being axially shiftable relative to the input shaft is journaled thereon and is nonrotatable with respect to the input shaft. This arrangement distinguishes from most conventional clutch actuator systems since the pressure plate and pressure actuator plate member is usually connected to the fly wheel and rotates with the engine.

It will be noted that a ball bearing unit 44 is interposed between the input shaft 17 and the inner surface of the boss 15, the outer race engaging the internal surface of the boss 15. It will also be noted that the axially extending flange 36 of the force transmitting plate 35 is positioned concentrically around the exterior surface of the boss 15. In the embodiment shown, there is a volumetric space 43 between the force applying plate 35 and the end of the boss 15 and associated ball bearing units 44. The clutch assembly of the transmission device, as illustrated in FIG. 1, is in driving relation with respect to the output shaft and the volumetric space 43 permits the force applying member to be shifted axially away from the clutch assembly in a de-clutching direction.

It will be also seen that a sleeve-type bearing 45 is positioned concentrically around the input shaft and is provided with a radial flange 46 which projects outwardly therefrom and which engages the interior surface of the boss 15. A thrust needle bearing 47 is interposed between the flange 46 and the ball bearing unit 44. It will also be noted that the input shaft 17 is provided with an external threaded portion 48 intermediate its end for accommodating a nut 49 thereon. The nut bearing against the flange 46 of the sleeve bearing 45. An 0-ring 50 is positioned around the input shaft and seals the interior of the housing from the exterior.

The clutch actuator assembly also includes a cam actuator, designated generally by the reference numeral 51, which is located exteriorly of the housing 11 and which includes an annular stationary cam 52 positioned around the input shaft 17. The stationary cam 52 is provided with an attachment ear 53 which projects outwardly therefrom, the attachment ear having an opening therein for accommodating a bolt 54 that engages a threaded opening in the end wall 13. Thus the stationary cam 52 is fixedly connected to the end wall 13 of the housing. The stationary cam 52 is provided with a generally helical shaped cam face 55 and has an axially extending stop shoulder 56 defined between the ends of the cam 55.

The cam actuator also includes an annular revolvable cam 57 disposed concentrically around the input shaft 17 and having a generally helically-shaped cam face 58, and an axially extending stop shoulder 59 defined between the ends of the cam face. It will be noted that the cam face 58 of the revolvable cam 57 is disposed in confronting relation with respect to the cam face 55. The stop shoulders on the revolvable and stationary cams are disposed in engaging relation when the clutch assembly is in driving relation with respect to the output shaft and are spaced from each other when drive to the output shaft is interrupted.

The revolvable cam 57 is provided with a radially projecting shifting arm 60 having an opening in the outer end thereof, the shifting arm being connected to any suitable shifting means such as a shifting rod, an hydraulic ram unit, or the like. A helically shaped split roller bearing unit 61 is disposed between the stationary and the revolvable cams and engages the confronting cam faces. The split roller bearing unit includes a helically shaped split race 62 having a plurality of roller bearing elements 63 revolvably mounted therein. It will therefore be seen that this split roller bearing unit 61 facilitates movement of the revolvable cam relative to the stationary cam.

A generally triangular-shaped, substantially flat shifter plate 64 is positioned exteriorly of the housing 11 and is positioned in engaging relation with the outer face of the revolvable cam 57. It will be noted that the triangular shifter plate 64 has a centrally located opening therein through which projects the input shaft 17, the opening being larger than the externally projecting portion of the input shaft. The shifter plate 64 also has a plurality of openings therein adjacent the truncated corners thereof, these openings each receiving the end portions of the bolts 39 therethrough.

The head 40 of each bolt bears against the outer surface of the shifter plate. With this arrangement, it will be seen that when the revolvable cam 57 is rotated in a declutching direction, this revolvable cam will be moved axially outwardly or away from the end wall 13, and will also urge the shifter plate 64 in the same direction. Movement of the shifter plate 64 in an axially outwardly or de-clutching direction will urge the force applying plate away from the pressure plate 32 and against the bias of the springs 41. Thus external power is needed to shift the clutch actuator assembly to disengage the clutch assembly and release of the revolvable cam will result in the revolvable cam and shifter plate being shifted to the clutch driving condition. This is completely different from the conventional transmission system.

The present transmission device 10 is preferably a wet clutch pack system, the housing being provided with a suitable liquid lubricant and being substantially sealed from the exterior. The transmission device is also bi-rotational and also may be directly mounted to the fly wheel end of an internal combustion engine.

By using an internally splined output shaft, the output shaft can be connected to the stub shaft of a driven mechanism. Another unique feature of the present transmission device is the use of a non-rotatable force applying plate which is journaled on the input shaft and is axially movable relative thereto. Applicant's utilizes a thrust bearing between the force applying plate and the pressure plate and subjects the force applying plate to a spring pressure for normally urging the clutch assembly into driving relation. It will also be noted that the spring pressure exerted by the springs acting on the force applying plate are absorbed by the input shaft since the axial pressure is transmitted to the end flange 19 of the input shaft. It will also be seen that none of the spring pressure is directed to the cylindrical wall of the housing 11.

Figure 5:
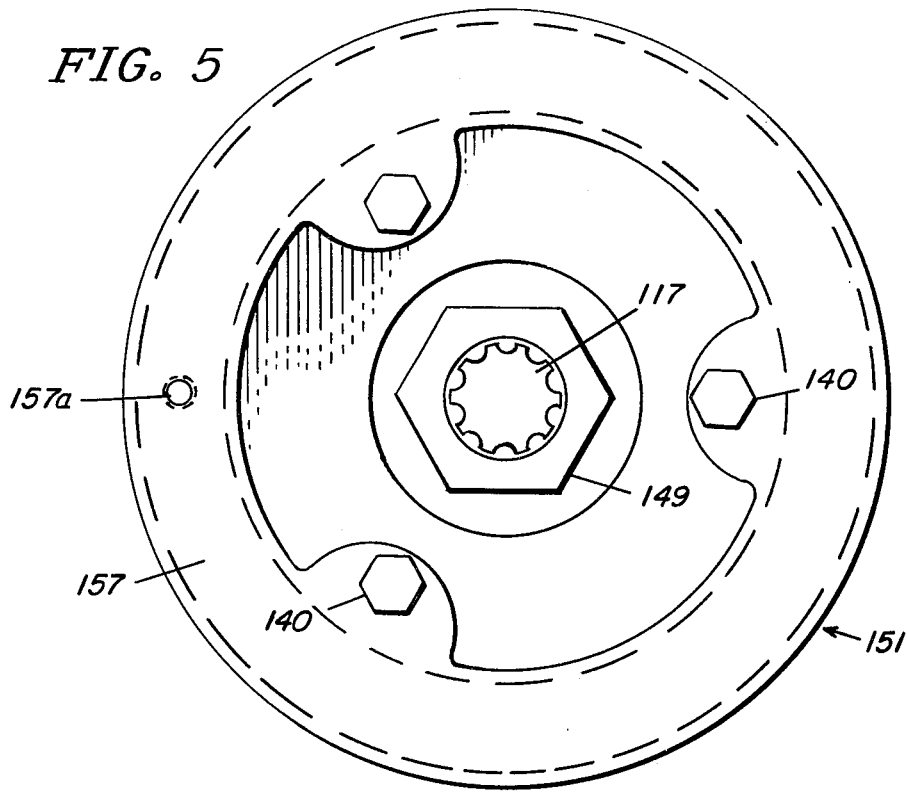
FIG. 5 is an end elevational view similar to FIG. 2 and illustrating a modified form of the clutch actuator assembly.
Figure 6:
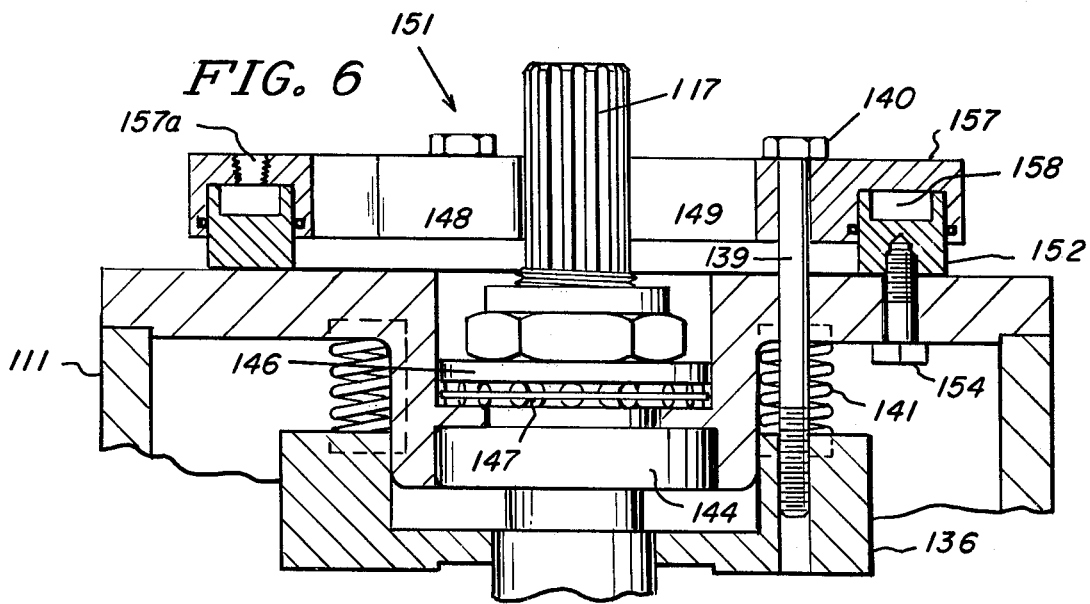
FIG. 6 is a cross-sectional view of the embodiments illustrated in FIG. 5, illustrating details of construction thereof.

Referring now to FIGS. 5 and 6, it will be seen that a modified form of the clutch actuator assembly is there shown and includes a pancake air cylinder designated generally by the reference numeral 151, which is located exteriorly of the housing 111. This pneumatic unit 151 includes a stationary chamber-defining member 152 which is of annular construction and which is provided with a plurality of threaded apertures in its rear face for threaded engagement by threaded bolts 154 which extends through the end wall of the housing. It will therefore be seen that the stationary cylinder-defining unit 152 is secured against the end wall of the housing. The cylinder-defining unit 152 has an outwardly facing annular recess 152a therein, as best seen in FIG. 6. The unit 151 also includes a shiftable piston 157 which is also of annular construction and which has a plurality of openings therethrough, through which project bolts 139. The bolts 139 are provided with heads 40 which engage the outer surface of the piston 157. It will be noted that the piston 157 has an inwardly facing annular recess therein which is disposed in registering relation with the annular recess 152a of the cylinder unit 152, to thereby define a pneumatic chamber 158. The piston 157 has a threaded port 157a therein which communicates with the chamber 158 and which is connectable to a suitable fitting which in turn is connected to a source of air under pressure.

It will also be seen that the bolts 139 are threadedly engaged in threaded recesses in the force transmitting plate 135 with suitable springs 141 positioned around the bolts 139, and engaging the force transmitting plate 135 and the inner surface of the end wall above the housing. It will therefore be seen that when air under pressure is applied to the chamber 158, the piston 157 may be urged outwardly to shift the force transmitting plate 135 in the same direction to thereby interrupt the drive to the output shaft. The springs 141 tend to yieldably resist movement of the first transmitting plate 135 and the piston 157 and will urge the force transmitting plate towards the engaged position. In this respect, it is pointed out that the transmission device operated by the actuator illustrated in FIGS. 5 and 6 is identical to that shown in FIG. 1. The valve control for operating the unit 151 may be locally or remotely located as desired.

From the foregoing description, it will be seen that we have provided a novel transmission device, which is not only of simple and inexpensive construction, but one which functions in a more efficient manner than any heretofore known comparable system.

What is claimed is:

1. A transmission device comprising a housing,
   a revolvable input shaft projecting into said housing and being revolvable relative thereto and being adapted to be connected to a source of power;
   a revolvable output shaft projecting into said housing for rotation relative thereto;
   a clutch assembly disposed between said input and output shafts and being operable upon shifting movement to transmit or interrupt drive with respect to the output shaft, said clutch assembly including a generally cylindrically shaped driven member connected with said output shaft for rotation therewith, clutch driver elements positioned interiorly of said driven member and engaging said input shaft for rotation therewith and being axially shiftable relative thereto, clutch driven elements engaging the interior of the cylindrical driven member for rotation therewith and for axial movement relative thereto,
   a pressure plate axially shiftable on said input shaft for urging the clutch driver elements into drive transmitting relation with the driven clutch elements,
   a clutch actuator assembly, mounted adjacent said input shaft and including a stationary cam, a revolvable cam adjacent said stationary cam, said cams being positioned exteriorly of said housing and confronting, generally helical camming surfaces, said revolvable cam when rotated being axially shiftable relative to said input shaft,
   a non-rotatable force transmitting plate positioned in said housing adjacent said pressure plate and being axially shiftable with respect to said input shaft towards and away from said pressure plate upon revolving movement of said revolvable cam and to shift said clutch assembly into and out of driving relation with respect to said output shaft,
   a shifter plate engaging said revolvable cam and being axially shiftable relative to said input shaft upon revolving movement of said revolvable cam,
   means directly connecting said force applying plate with said shifter plate,
   resilient means engaging said force applying plate to normally urge the latter in a drive transmitting direction and yieldably resisting movement of said force applying member in a drive interrupting direction,
   means connected with said revolvable cam for revolving the same.

2. The transmission device as defined in claim 1 wherein said force transmitting member is positioned concentrically around said input shaft and is axially spaced from said pressure plate, said pressure plate being splined to said input shaft for rotation therewith.

3. The transmission device as defined in claim 1 wherein said means comprises a plurality of elongate threaded elements connected to said force applying member and projecting exteriorly of the housing and engaging the shifter plate.

4. The transmission device as defined in claim 1 wherein said resilient means includes a plurality of helical springs each engaging said force applying member and each urging said force applying member towards the pressure plate to normally urge the clutch assembly into drive transmitting relation with respect to the output shaft.

5. The transmission device as defined in claim 1 wherein said stationary and revolvable cams have helical confronting camming faces, cooperating stop shoulders on said cam for limiting revolving movement of the revolving cam in a direction to shift the clutch assembly into driving relation with respect to the output shaft, and bearing means interposed between the cam bases on said cams.

6. A transmission device comprising a housing:

a revolvable input shaft projecting into said housing and being revolvable relative thereto and being adapted to be connected to a source of power;

a revolvable output shaft projecting into said housing for rotation relative thereto;

a clutch assembly disposed between said input and output shafts and being operable upon shifting movement to transmit or interrupt drive with respect to the output shaft, said clutch assembly including a generally cylindrically shaped driven member connected with said output shaft for rotation therewith, clutch driver elements positioned interiorly of said driven member and engaging said input shaft for rotation therewith and being axially shiftable relative thereto, clutch driven elements engaging the interior of the cylindrical driven member for rotation therewith and for axial movement relative thereto;

a pressure plate axially shiftable on said input shaft for urging the clutch driver elements into drive transmitting relation with the driven clutch elements;

a clutch actuator assembly, mounted adjacent said input shaft and including a stationary member, a shiftable member adjacent said stationary member, said members being positioned exteriorly of said housing, and said shiftable member being axially shiftable relative to said input shaft;

a non-rotable force transmitting plate positioned in said housing adjacent said pressure plate and being axially shiftable with respect to said input shaft, towards and away from said pressure plate upon axial movement of said shiftable member to shift said clutch assembly into and out of driving relation with respect to said output shaft;

means directly connecting said force applying plate with said shiftable member;

resilient means engaging said force applying plate to normally urge the latter in a drive transmitting direction and yieldably resisting movement of said force applying member in a drive interrupting direction;

means operatively interrelated with said shiftable member for axially shifting the same.

7. The transmission device as defined in claim 6 wherein the stationary member of said clutch actuator assembly comprises a cylinder connected to a source of fluid under pressure, said shiftable member comprising a piston axially moveable with respect to said cylinder.

8. The transmission device as defined in claim 6 wherein said means connecting said shiftable member with said force applying plate comprises a plurality of elongate threaded elements.

* * * * *